Jan. 9, 1940. J. J. McCAULEY 2,186,835
FOAM REMOVING UTENSIL AND STRAINER
Filed April 18, 1938
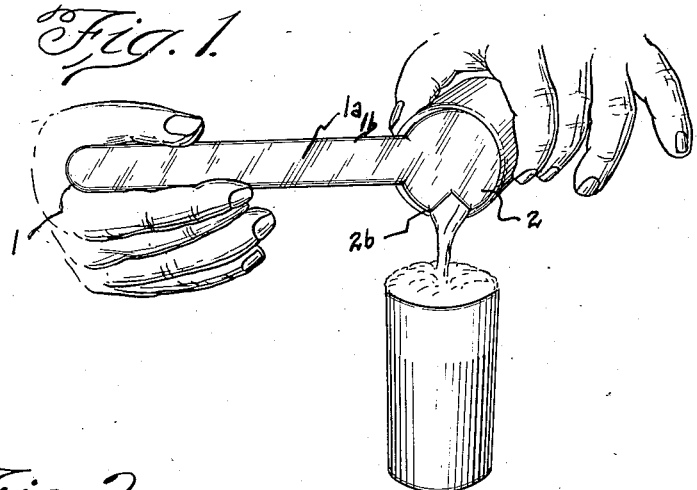
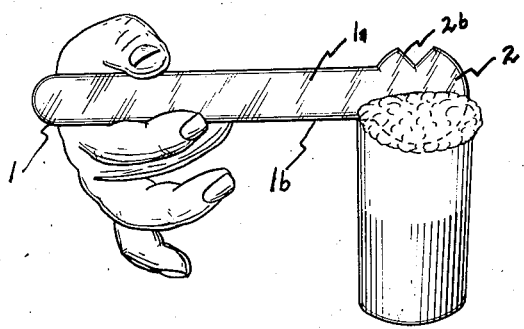
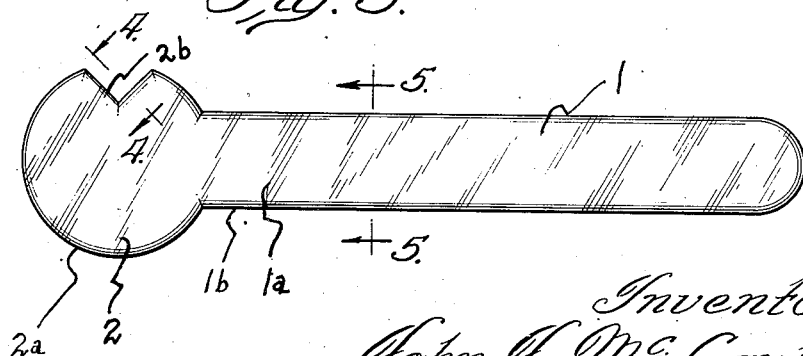
Inventor:
John J. McCauley.
By John H Brezina
Att'y.

Patented Jan. 9, 1940

2,186,835

UNITED STATES PATENT OFFICE 2,186,835

FOAM REMOVING UTENSIL AND STRAINER

John J. McCauley, Chicago, Ill.

Application April 18, 1938, Serial No. 202,810

1 Claim. (Cl. 65—12)

This invention is an improved foam removing utensil and strainer and is intended especially for use as a bartender's implement as will hereinafter be more fully set out.

In the proper serving of beer, or other carbonated beverages, particularly beer which is drawn from the conventional draught arm such as is used in taverns and the like, it is often to be noted that beer may have an excessive "head" or amount of foam. This is particularly true when a new barrel of beer is opened or when the beer for any reason at all becomes excessively carbonated. When an excessive head of foam occurs on the drawing of a glass of beer it is necessary for the bartender to scoop out a portion of the excessive foam and to very carefully draw additional heavy liquid so that the customer will get the amount of liquid which he should.

In the past, it has been usual for a bartender to use a device known as a bartender's comb which is not formed or shaped to easily fit into a glass, the conventional form of a previously known bartender's comb being a flat, relatively long and thin piece of material which is the same width throughout its entire length and which is generally satisfactory for passing over the lip edges of a glass, but which must be manipulated angularly a number of times across and into a glass to remove excess foam. The drawing of beer or the like may thus often be a slow matter when the beer is "wild". Further, a conventional beer comb will not cover the top of a glass when a bartender is pouring beer from one glass to another and the foam will often gush over the same and fall into the glass into which the beer is being poured.

It is the purpose of the device herein disclosed, and which is illustrated on the attached drawing, to provide an article of the above described class which may be used to effectively scoop out excess foam from a glass of beer at a single stroke, thus effecting a savings in time required to serve the same, and to provide a device which will enable easy pouring of beer or the like from one container into another, whereby the undesirable foam may be retained in the container from which the beer is being poured.

A further object of this device is to provide a bartender's implement with the aforementioned advantages which also has a straight edge portion which may be drawn across the very top of a glass of beer, removing, if desired, only the top foam.

A still further object of this invention is to provide a device having all the advantages aforementioned, which is economical to manufacture, and one which has wide utility as an advertising novelty, it being obvious that the imprint of, say, a brewery or distributor of beer, or the like, may be imprinted upon the handle for advertising purposes.

Other and further objects of this device will be apparent from the drawing and from the detailed description which follows.

On the drawing:

Fig. 1 is a side elevational view of the device showing how the device is used in pouring a liquid such as beer or the like from one container into another and showing how the relatively enlarged head portion of the implement fits over the open end of a glass for retaining the undesirable foam therein, yet permitting pouring of the heavy liquid therefrom.

Fig. 2 is a side elevational view of the device showing how a relatively enlarged head portion thereof may be used to scoop out the excess foam from a glass of beer at a single stroke and particularly illustrating how the one curved edge thereof extends substantially into a glass for the purposes aforementioned.

Fig. 3 is a side elevational view of the device as it appears when not in use.

Fig. 4 is a fragmentary cross sectional view taken substantially along the line 4—4 of Fig. 3, illustrating in plan view, at the left of said figure, a portion of the opening or recess in the head portion of the device, as said portion is otherwise shown on the drawing.

Fig. 5 is a cross sectional view taken substantially along the line 5—5 of Fig. 3, illustrating the relatively thin preferred form of the device, which is of approximately the same thickness throughout its entire length, including the head portion.

As shown on the drawing:

The numeral 1 indicates the handle portion which, as shown in Fig. 5, consists, in preferred form, of a relatively long and thin piece of preferably flexible material. The handle portion proper is several inches in length and will obviously easily fit into the hand.

Numeral 1a is used to illustrate a neck or extended portion of the handle 1, in preferred form being formed integral therewith and being provided with an edge portion 1b which is adapted to be drawn across the top of a glass of beer or the like to remove the topmost portion of the "head".

While it is essential that portion 1a be provided with an edge portion 1b, substantially as shown, it is not necessary that the handle 1 be so provided, although as shown on the drawing, handle portion 1 is illustrated as having an edge portion. It should be obvious that the handle portion 1 may be formed ovalescent or rounded in cross section, should it be preferable that it be formed in this manner.

It is desirable, however, that at least one side of the handle portion 1 be provided with at least one relatively flat surface, not shown, upon which appropriate advertising, trade mark, or other desirable indicia may be imprinted with flat type.

Numeral 2 is used to illustrate a head portion, which, in preferred form, is formed substantially in the shape of a disc and is preferably relatively thin in cross section, as shown in Fig. 4. The disc 2 is necessarily of greater diameter than is either the neck portion 1a or the handle 1 so that the one arcuate edge 2a thereof will extend downwardly substantially into a glass of drawn beer or the like, as shown in Fig. 2, for the purpose of scooping out excess foam on the liquid at a single stroke or movement.

As shown in Fig. 3, the disc or head portion 2 is provided with an opening or recess 2b, which in preferred form is substantially V-shaped. The purpose of the V-shaped opening or recess in the head or disc portion is to provide an outlet for liquid when the entire head portion shown on the drawing, is used to cover a glass and as a strainer substantially as shown in Fig. 1.

It should be obvious that while a preferred form of the head 2 is shown as a disc, this portion may be formed substantially rectangular, or ovular or of other appropriate general shapes and that the opening or recess 2b in the disc portion or head 2 may be formed in other shapes than as particularly illustrated and described as a preferred form and that when the head or the opening therein are formed in other shapes than those illustrated they will likewise function substantially as is herein set forth.

There is some advantage, however, in a V-shaped opening in that the widened edge portion will permit heavy liquid to pass relatively easily and the narrow top portion of the same will tend to restrict passage of the foam.

To use my device for the purposes of scooping off only the very topmost portion of a drawn glass of beer or the like, it is merely necessary to draw the neck portion 1a, particularly the edge portion 1b, across the very topmost portion of the glass containing the liquid.

To use my device to scoop out the excess foam from a glass of beer and thus eliminate the necessity for four or five separate motions such as set forth hereinbefore, it is merely necessary to lower edge portion 2a substantially into the glass of drawn liquid, as shown in Fig. 2, and with a single movement, to scoop out sufficient of the excess foam to permit the glass to be filled to proper level with heavy liquid.

To use my device as a strainer or for the purpose of pouring beer or the like from one container to another it is merely necessary to turn the device in the hand, thus reversing the portion of the head or disc portion 2, substantially as shown in Fig. 2, and place the head or disc portion 2 over the top of the glass or the like. The heavy liquid may then be poured through the opening or recess 2b and the body of the head or disc portion 2 will retain the excess and undesirable foam in the utensil from which the liquid is being poured.

It is within my contemplation that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claim.

I claim:

In a foam removing utensil and strainer the combination of a straight, elongated and relatively thin portion adapted to be used as a handle, a portion of one edge of said elongated portion being straight for passing over the edges of a glass to remove the top foam from beer or the like in said glass, a flat, thin head portion integral with said elongated portion, said head portion being in the shape of a flat thin disc in the plane of the elongated portion, for scooping out a portion of foam from a glass, said head portion being provided with an aperture therein to allow the head portion to be placed across the mouth of a glass for retaining foam therein, yet permitting easy flow of heavy liquid from said glass through said aperture, substantially as and for the purposes set forth.

JOHN J. McCAULEY.